Patented Jan. 10, 1933

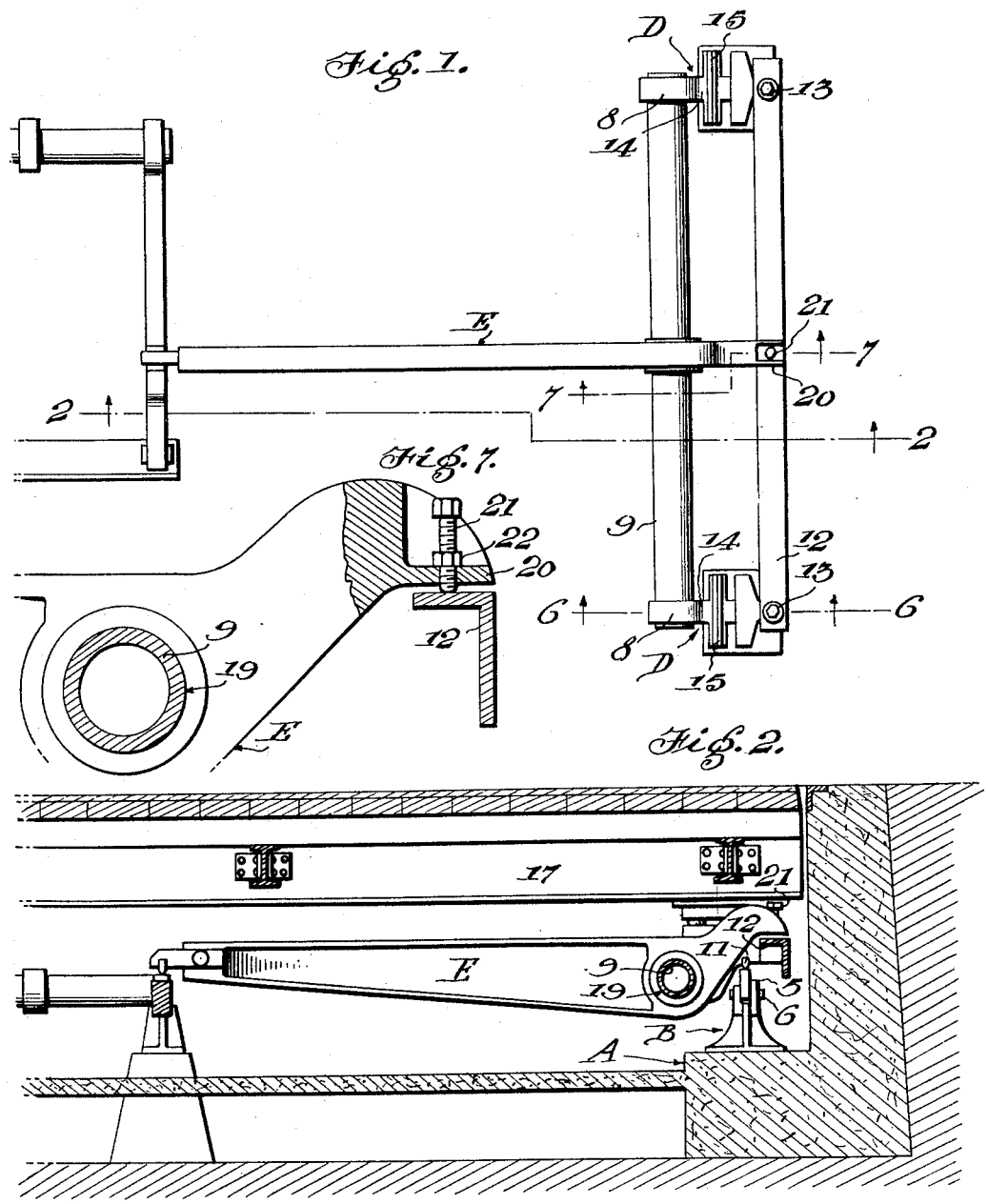

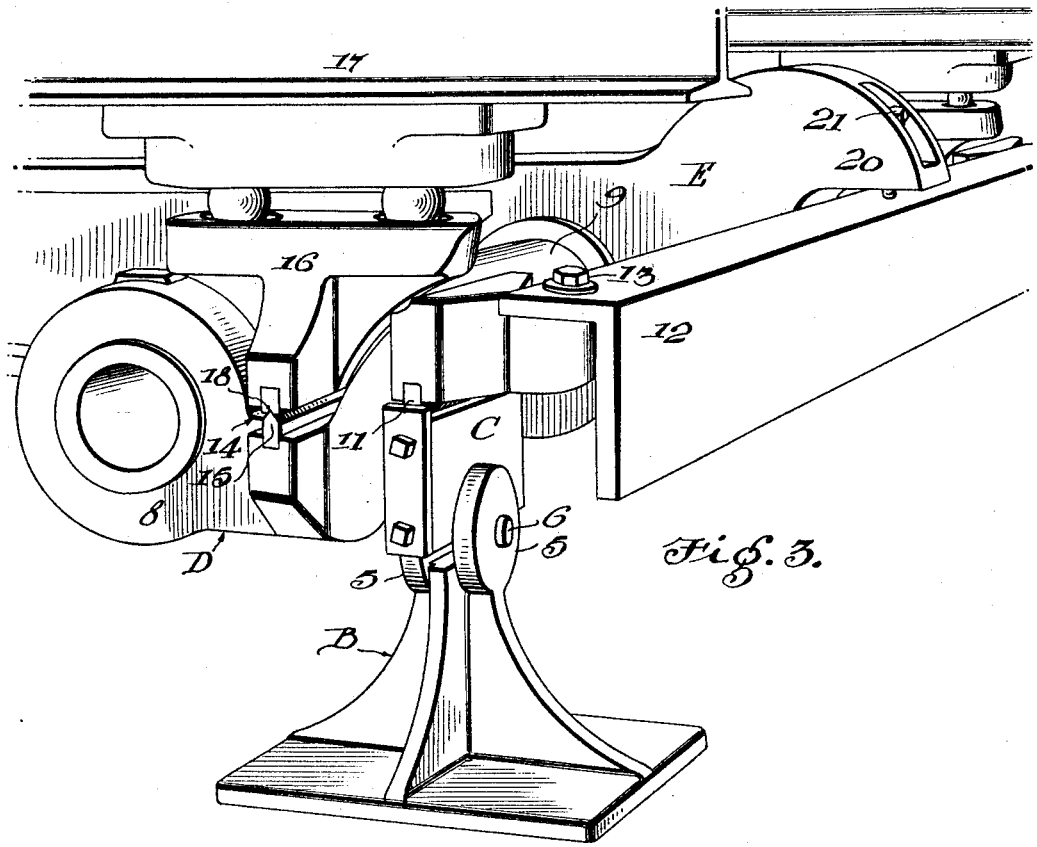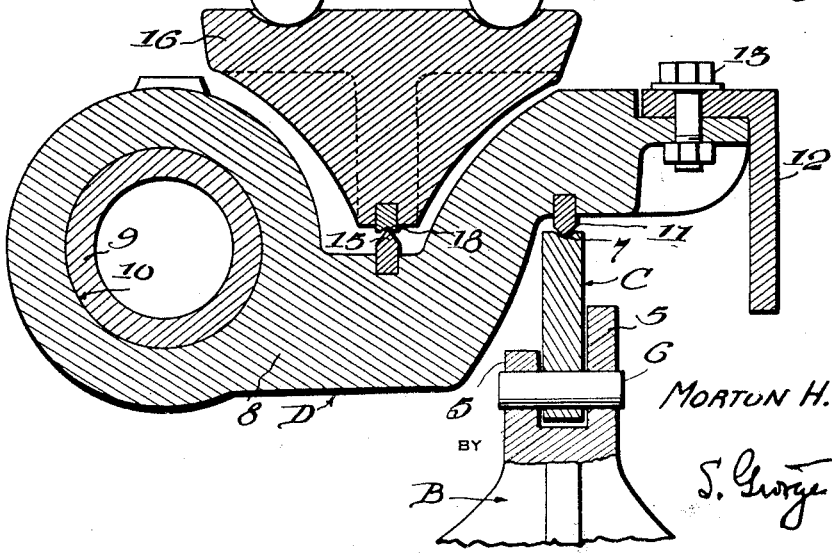

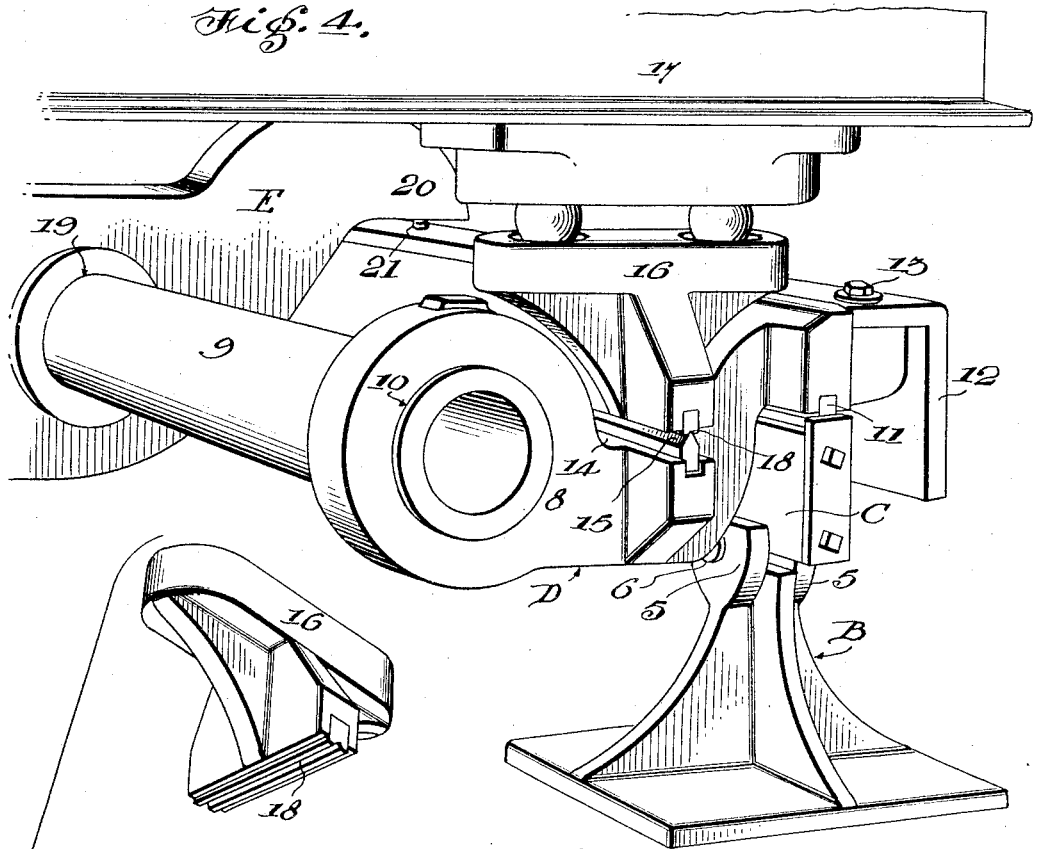
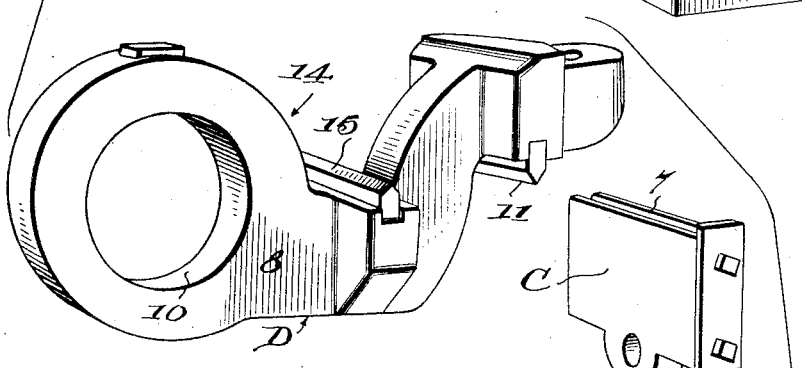
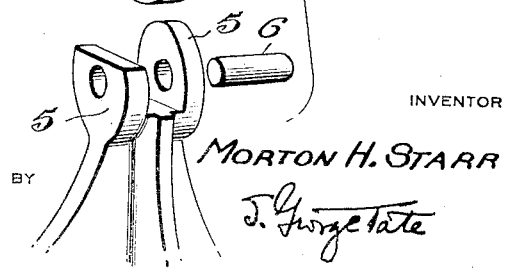

1,894,009

UNITED STATES PATENT OFFICE

MORTON HULL STARR, OF BELOIT, WISCONSIN

WEIGHING SCALE

Application filed September 29, 1931. Serial No. 565,853.

This invention relates to new and useful improvements in weighing scales generally, although more particularly to that type known in the trade as "motor truck scales".

In scales of the motor truck types, it is desirable to design the lever system as simply as possible with respect to the number of knife edges and bearings used, and also to maintain the specific requirements to the smallest amount consistent with good practice. The Howe lever system as used in motor truck scales satisfies these conditions to a greater extent than other forms now on the market, but owing to the manner in which the levers themselves are made, the design cannot be economically expanded to weigh higher capacities and still keep the structure within limits established by good scale practice. The Howe lever system is popularly known as the "torsional" type. This signifies that the portion of the levers joining the principal knife edges must resist torsion, and due to the overhang of the load knife edges with respect to the axes joining the support, the knife edges must also resist bending. This combination of bending and torsion causes extremely high stress moments and demands a shape of large sectional dimension to maintain the structures within reasonable space limits.

The object of this invention is to maintain the advantage of simplicity of that type of lever system and overcome the disadvantages following the presence of combined torsional and bending moments in combination.

Another object is to provide flexibility in the disposition of the levers wherein by the use of the same knife edge carrying elements, a wide variation in horizontal dimensions may be accommodated.

Another object of the invention is to accomplish this flexibility without in any way jeopardizing the weighing characteristics of the scale.

Another object of the invention is to provide a construction which will permit the ready removal and replacement of the knife edge carrying elements in the field without the necessity of sending the scale to the factory when the knife edges become worn.

Another object of the invention is to provide ease of inspection of the parts and ease of manufacture.

With these and other objects in view which will more fully appear, the nature of the invention will be more clearly understood by following the description, the appended claims, and the several views illustrated in the accompanying drawings.

In the drawings:—

Figure 1 is a top plan view of the main scale lever and its supporting structure embodying the subject matter of my invention, Figure 2 is a vertical longitudinal sectional view showing the application of my invention to a pit, Figure 3 is a perspective view of the assembly, Figure 4 is a perspective view of the assembly but taken at a different angle from Figure 3, Figure 5 is a view showing different parts in perspective and in separated relation, Figure 6 is a vertical longitudinal sectional view through the lever frame and fulcrum standard, and Figure 7 is a detail sectional view showing the adjustable fulcrum screw for the outer end of the main lever.

Referring to the drawings, I have located my invention in a pit A, in each end of which are positioned spaced fulcrum standards B, B, each having its upper end bifurcated to form spaced guide arms 5, 5 which are connected by a bearing pin 6. The upper ends of the arms extend above the pin and form a vertical guide for a bearing block C which is seated on the bearing pin and projects above the arms 5, 5 and is provided on its upper edge with a transversely extending knife edge seat 7. A lever frame D is associated with both standards, and comprises two longitudinally extending platform-supporting side arms 8, 8 of like construction, and a transverse tube or pipe 9 constituting a transverse load-supporting member. Each arm 8 is provided adjacent its inner end with a transverse bearing opening 10 of a diameter to freely receive the tube or pipe 9, and the arm adjacent its outer end is provided with a downwardly projecting and transversely extending knife edge 11. The knife edges 11, 11 of the arms 8, 8 are positioned in the seats 7, 7 of the bearing blocks C, C, and the outer ends of the arms 8, 8 project beyond the knife edges 7, 7 and are connected by a transverse fulcrum bar 12 preferably of angle iron construction, and preferably secured to the arms 8, 8 by bolts 13, 13. Thus, it will be seen that the transverse bar 12 and the transverse pipe 9 are located on opposite sides of the knife edges 11, 11. The arms 8, 8 are each centrally recessed as at 14 between the pipe 9 and the knife edge 11, and mounted in the bottom of each recess is an upwardly projecting and transversely extending knife edge 15. Supporting blocks 16, 16 for the platform 17 are freely mounted in the recesses 14, 14 and are provided on the lower edges with knife edge seats 18, 18 for receiving the knife edges 15, 15.

A load-carrying lever arm E extends longitudinally and centrally between the arms 8, 8 of the lever frame D, and adjacent its outer end the lever is formed with an opening 19 for freely receiving the pipe 9. The outer end of the lever extends upwardly and overhangs the fulcrum bar 12 to form a fulcrum nose 20. A vertically adjustable fulcrum screw 21 is threaded into the nose 20 for cooperation with the fulcrum bar 12, and is adapted to be retained in an adjusted position by a clamping nut 22. The inner end of the load-carrying lever arm E is connected to the indicator mechanism in the usual manner.

Considering the lever system statically, when loads are imposed upon the load knife edges of the side arms, predetermined reactions exist at the fulcrumed knife edges and knife edge in tip end of lever arm. These loads produce negative bending in the pipe and positive bending in the angle bar. The volume of these forces is determined by the ratio of the lever system.

It will be readily seen that by providing the side arms with a shape that is true to dimensions within the necessary limits, and adapting the associated parts to, but slidably mounted upon the side arms within the same necessary limits, the lever arm can occupy any position with relation to the knife edge side arms, and the length of the load-carrying lever arm may be adapted to suit conditions.

It is only necessary to control within the necessary limits, the center distances between the knife edges and the axis of the pipe in the manufacturing operations to provide interchangeability of these parts, inasmuch as the center distances cannot change due to wear as there is no relative movement between the lever arm and the control lever.

The centers of the associated parts not being subject to change through wear through the use of the scale, it follows that like parts with like center distances can be substituted for the original parts without affecting the characteristics of scale performance.

From the foregoing, it will be observed that the lever frame D, the fulcrum bar 12, and the load-carrying lever arm E conjointly form a lever, and that these parts of the lever are so disposed with respect to forces imposed by the load as to be subject principally to bending stresses as distinguished from torsional stresses.

It is of course to be understood that the details of structure and arrangements of parts may be variously changed and modified without departing from the spirit and scope of my invention.

I claim:—

1. In a weighing scale, the combination with a pair of fulcrum standards, of a lever frame including spaced side arms respectively fulcrumed intermediate their inner and outer ends on the standards, a fulcrum bar supported on the outer ends of the side arms, and a load-carrying lever arm having a pivotal supporting connection intermediate its ends on the frame on the side of the fulcrum of said frame opposite the fulcrum bar and having its outer end overhanging the bar for engagement therewith.

2. In a weighing scale, the combination with a pair of fulcrum standards, of a lever frame including spaced side arms respectively fulcrumed intermediate their inner and outer ends on the standards, a fulcrum bar supported on the outer ends of the side arms, and a load-carrying arm located intermediate the side arms of said frame and having a pivotal supporting connection intermediate its ends on the frame on the side of the fulcrum of said frame opposite the fulcrum bar and having its outer end overhanging the bar for engagement therewith.

3. In a weighing scale, the combination with a pair of fulcrum standards, of a lever frame including spaced side arms respectively fulcrumed intermediate their inner and outer ends on the standards, a fulcrum bar supported on the outer ends of the side arms, a load-carrying lever arm having a pivotal supporting connection intermediate its ends on the frame on the side of the fulcrum of said frame opposite the fulcrum bar and having its outer end overhanging the bar for engagement therewith, and a vertically adjustable fulcrum screw secured to the overhanging end of the lever for cooperation with the fulcrum bar.

4. In a weighing scale, the combination with a pair of fulcrum standards, of a lever frame including spaced side arms respectively fulcrumed intermediate their inner and outer ends on the standards and a pipe connecting the inner ends of the arms, a fulcrum bar supported on the outer ends of the side arms, and a load-carrying lever arm having a pivotal supporting connection intermediate its ends on the pipe and having its outer end overhanging the bar for engagement therewith.

5. In a weighing scale, the combination with a pair of fulcrum standards, of a lever frame including spaced side arms respectively fulcrumed intermediate their inner and outer ends on the standards and a transversely disposed pipe loosely mounted in the inner ends of the arms, a fulcrum bar supported on the outer ends of the side arms and disposed in parallelism with said pipe, and a load-carrying lever arm having a pivotal supporting connection intermediate its ends on the pipe and having its outer end overhanging the bar for engagement therewith.

6. In a weighing scale, the combination with a pair of fulcrum standards, of a lever frame including spaced side arms respectively fulcrumed intermediate their inner and outer ends on the standards and a transversely disposed pipe loosely mounted in the inner ends of the arms, a fulcrum bar supported on the outer ends of the side arms and disposed in parallelism with said pipe, and a load-carrying lever arm located intermediate the side arms of the frame and having supporting connection with the pipe and having its outer end overhanging the bar for engagement therewith.

7. In a weighing scale, the combination with a pair of fulcrum standards, of a lever frame including spaced side arms respectively fulcrumed intermediate their inner and outer ends on the standards and a transversely disposed pipe mounted in the inner ends of the arms, a fulcrum bar supported on the outer ends of the side arms and disposed in parallelism with said pipe, and a load-carrying lever arm located intermediate the side arms of the frame and having pivotal supporting connection with the pipe and having its outer end overhanging the bar for engagement therewith.

8. In a weighing scale, the combination with a pair of fulcrum standards, of a lever frame including spaced side arms respectively fulcrumed intermediate their inner and outer ends on the standards and a transverse load-carrying member connecting the inner ends of the arms, a fulcrum bar supported on the outer ends of the side arms, a load-carrying lever arm having a pivotal supporting connection intermediate its ends on the transverse member and having its outer end overhanging the bar for engagement therewith, the side arms intermediate the transverse member and the fulcrum axis of the frame being respectively formed with downwardly extending recesses, and platform-supporting blocks respectively located in the recesses and fulcrumed on the arms.

9. In a weighing scale, the combination with a pair of spaced fulcrum standards, of bearing blocks respectively fulcrumed on the standards, a lever frame including spaced side arms respectively fulcrumed intermediate their inner and outer ends on the bearing blocks, a fulcrum bar supported on the outer ends of the side arms, and a load-carrying lever arm having a pivotal supporting connection intermediate its ends on the frame on the side of the fulcrum of said frame opposite the fulcrum bar and having its outer end overhanging the bar for engagement therewith.

In testimony whereof I affix my signature.
MORTON HULL STARR.